(12) United States Patent
Looker et al.

(10) Patent No.: US 6,866,453 B2
(45) Date of Patent: Mar. 15, 2005

(54) CARGO NET

(75) Inventors: Robert Looker, Carpenteria, CA (US); Richard McLennan, Rancho Palos Verdes, CA (US)

(73) Assignee: Satron, Inc., El Segundo, CA (US)

( * ) Notice: Subject to any disclaimer, the term of this patent is extended or adjusted under 35 U.S.C. 154(b) by 0 days.

(21) Appl. No.: 10/641,508

(22) Filed: Aug. 14, 2003

(65) Prior Publication Data

US 2004/0076488 A1 Apr. 22, 2004

Related U.S. Application Data

(63) Continuation of application No. 10/038,056, filed on Jan. 3, 2002, now Pat. No. 6,637,991.

(51) Int. Cl.[7] ............................ D04G 1/00; B61D 45/00
(52) U.S. Cl. ............................. 410/96; 410/118; 87/12
(58) Field of Search ............................. 410/96, 97, 98, 410/100, 106, 110, 118; 87/2, 12, 13, 56

(56) References Cited

U.S. PATENT DOCUMENTS

| | | | | |
|---|---|---|---|---|
| 1,966,893 A | * | 7/1934 | Harris | 410/156 |
| 2,455,237 A | * | 11/1948 | Davis | 410/97 |
| 3,011,820 A | * | 12/1961 | Frieder et al. | 294/77 |
| 3,173,539 A | * | 3/1965 | Looker | 206/597 |
| 3,204,798 A | * | 9/1965 | Becker | 414/607 |
| 3,727,581 A | * | 4/1973 | Brent | 119/453 |
| 3,961,585 A | * | 6/1976 | Brewer | 410/97 |
| 4,158,985 A | * | 6/1979 | Looker et al. | 87/12 |
| 4,651,620 A | * | 3/1987 | Lyons | 87/12 |
| 5,050,924 A | * | 9/1991 | Hansen | 296/100.15 |
| 5,167,299 A | * | 12/1992 | Nusbaum | 182/138 |
| D344,388 S | * | 2/1994 | Fellion | D34/35 |
| 5,452,973 A | * | 9/1995 | Arvin | 410/118 |
| 6,123,294 A | * | 9/2000 | Genovese | 244/110 C |
| 6,353,982 B1 | * | 3/2002 | Looker et al. | 24/302 |
| 6,637,991 B2 | * | 10/2003 | Looker et al. | 410/97 |
| 2004/0076488 A1 | * | 4/2004 | Looker et al. | 410/97 |

* cited by examiner

Primary Examiner—D. Glenn Dayoan
Assistant Examiner—Paul Chenevert
(74) Attorney, Agent, or Firm—Perkins Coie LLP

(57) ABSTRACT

A cargo netting having a knotted bottom webbing and an upper knotted rope strand section. The bottom webbing is flat to reduce abrasion and wear and tear. The bottom webbing attaches to a cargo pallet using pallet attachment fittings.

19 Claims, 2 Drawing Sheets

CARGO NET

This application is a continuation of U.S. application Ser. No. 10/038,056, filed Jan. 3, 2002 now U.S. Pat. No. 6,637,991, which is incorporated herein by reference in its entirety.

BACKGROUND OF THE INVENTION

The field of the present invention relates to aircraft cargo nets.

Aircraft cargo nets are used primarily to restrain cargo in aircraft after the cargo has been placed on an aircraft pallet. Today, virtually all aircraft cargo nets are made of rope fabricated into a large diamond- or square-patterned net structure. Initially, the nets were constructed entirely of woven webbing stitched together at the interstices to form the patterned net structure. Then, for reasons of cost and ease of manufacture, knotted rope replaced the stitched-together webbing as the material of choice for commercial aircraft cargo nets approximately twenty-five years ago. Since then, cargo nets comprising webbing have seen little, if any, commercial use as rope nets have been used almost exclusively.

In use, cargo nets are subjected to substantial wear and tear. The environment in which cargo nets are used creates extensive abrasion on the net structure. Cargo nets may be significantly damaged by exposure to extreme weather conditions, repeated attachment and removal from cargo pallets, dragging across tarmacs and floors, and being run into and over by machinery such as forklifts. As a result, the life span of a cargo net may be drastically reduced.

The purpose of the cargo net, of course, is to hold the cargo in place on the pallet—not only during the loading and unloading process, but also during flight. Planes must maintain balance within certain limits to remain flight-worthy, and if cargo nets failed during flight leading to a sufficiently large shifting of cargo and hence weight within the hold of an airplane, the plane's ability to fly could be compromised. Indeed, there have been plane crashes that were attributed to shifting of cargo.

Therefore, cargo nets are frequently inspected, and if damaged or worn, must be repaired or replaced. That creates cost and delay, and is therefore to be avoided to the extent possible.

Not surprisingly, it is the lower rope section of the cargo net, which is that section nearest where the cargo net attaches to the pallet, that suffers the most abrasion and wear and tear. The abrasion and wear and tear on this section of the net has several sources, with pallet attachment fittings causing the bulk of the damage by continuously rubbing against the ropes they are attached to. When the cargo net is not attached to an aircraft pallet, the fittings may slide freely back and forth along the rope and cause minor abrasions. When a cargo net is attached to a pallet, the net is tightened about the pallet and its contents. Tightening the net creates a great deal of additional pressure between the fittings and the ropes. The additional pressure only exacerbates the abrasive effect the fittings have on the ropes, especially as the pallet is moved and jostled about during transportation. Thus, the fittings steadily deteriorate the condition of the ropes they are attached to until the cargo net becomes unusable. The rope, being round, tends to allow the fittings to move more easily along the rope, and tends to concentrate the abrasion from the fittings on one side of the rope, thereby hastening the extent of the damage.

Therefore, there is a need in the art for an improved air cargo net that exhibits increased resistance to the wear and tear to which the nets are routinely subjected.

SUMMARY OF THE INVENTION

The present invention is a cargo net in which the upper sections of the net, that is the portions that in normal use will reside on the top and upper sides of the cargo on the pallet, being constructed of conventional knotted rope, but with the lower section of the net constructed with webbing. The rope and webbing sections are preferably joined together by knotting. Preferably, the webbing is flat on both sides. The flat sides of the webbing reduce the wear and tear on the lower section of the cargo net by spreading the abrasive forces over a larger surface area. Reducing wear and tear on the lower section of the cargo net increases the life span of the cargo net.

In the preferred embodiment of this invention, only the very lowest section of the net, that is, the section that is attached to the fittings, is comprised of webbing. Alternatively, a larger section of the cargo net or the entire cargo net could be comprised of knotted webbing.

DETAILED DESCRIPTION OF THE PREFERRED EMBODIMENTS

Figure 1:
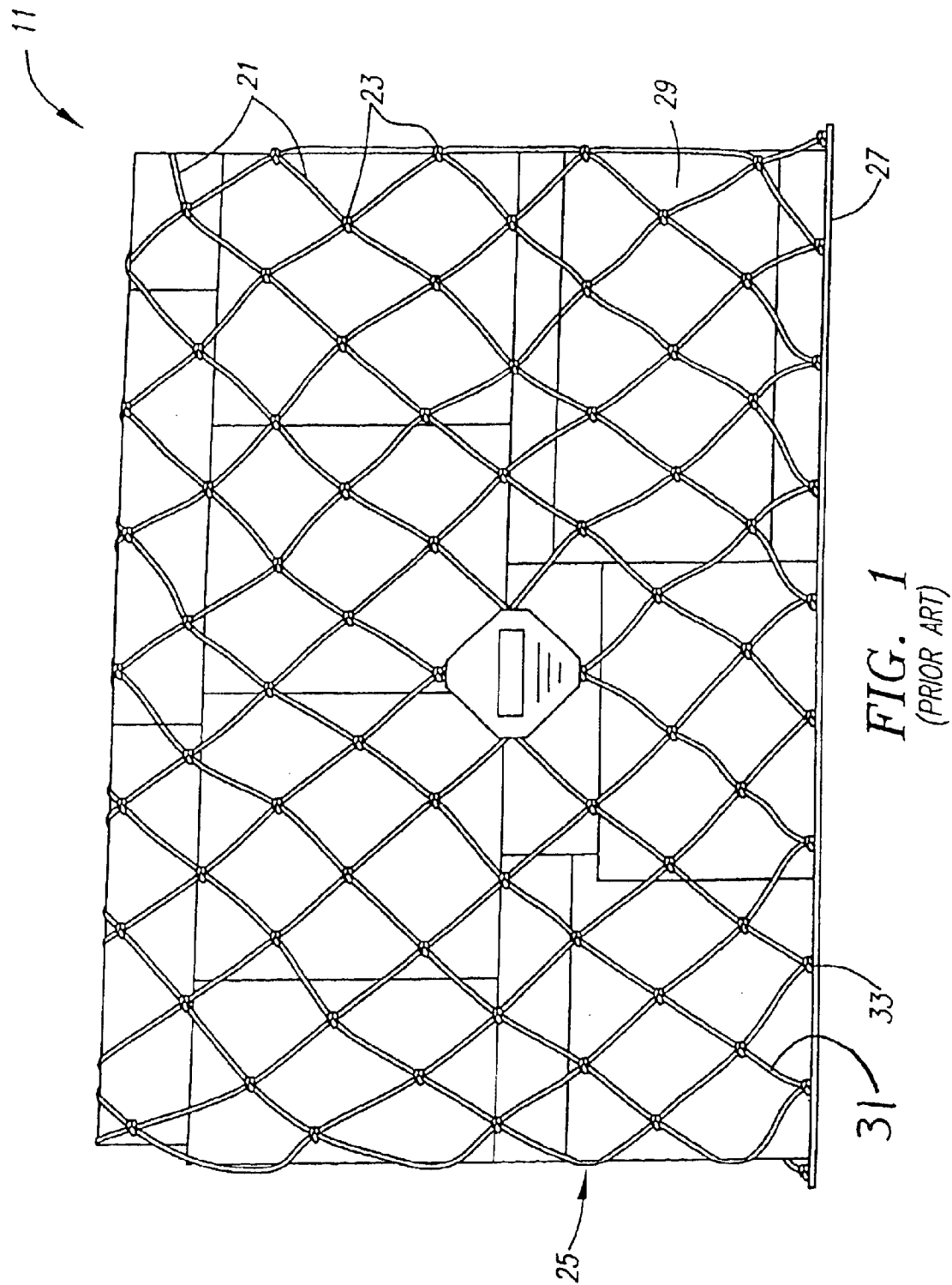
FIG. 1 illustrates a cargo net as it exists in the prior art.

FIG. 1 illustrates a cargo net 11 as it exists in the prior art. Previously, cargo nets have been fabricated entirely of strands of rope 21. The strands are joined together 23 at regular intervals to form a lattice 25 of diamond shaped openings that is shaped like an open ended cube to fit over the pallet 27 and its contents 29. The rope comprising the bottom-most section 31 of the lattice 25 passes through a plurality of pallet attachment fittings 33, with one pallet attachment fitting 33 preferably positioned in each section of the diamond of the lattice 33 on the bottom section 31. In some usages, the fittings 33 are not attached to each section, but every other section. The fittings are used to anchor the cargo net 11 to the pallet 27 and secure the contents 29 for transport.

Figure 2:
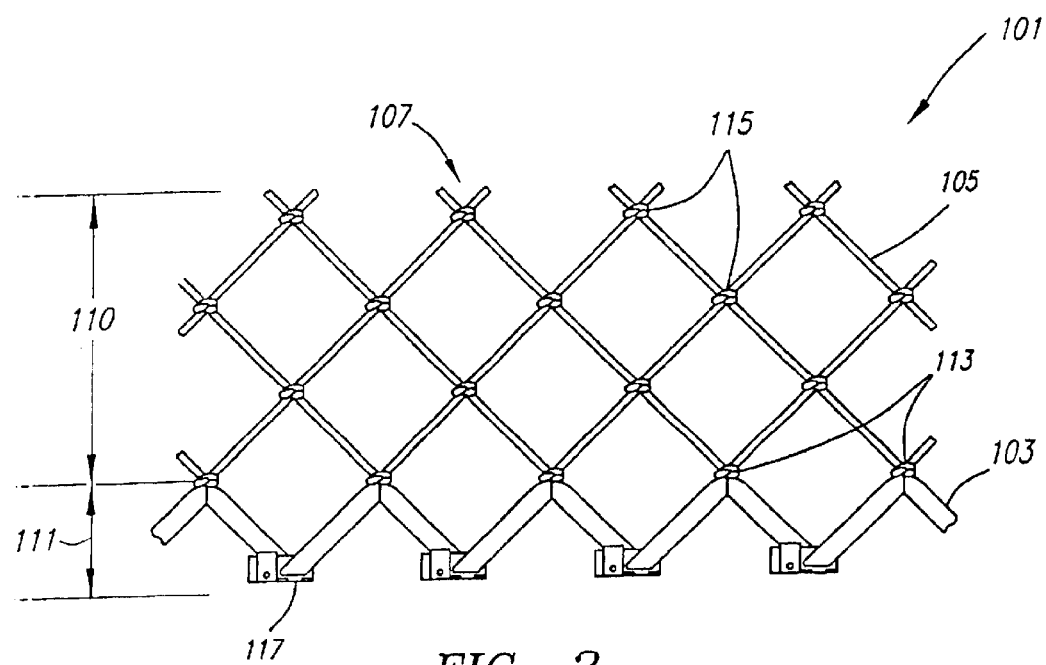
FIG. 2 is a close up of a cargo net with a bottom webbing according to a preferred embodiment.

FIG. 2 illustrates a preferred embodiment of the invention. Unlike the cargo net illustrated in FIG. 1 which is fabricated entirely of rope, the bottom section of rope is replaced with a flat webbing 103. The upper section 110 of the cargo net 101 comprises strands of rope 105 joined together to form a lattice 107 of diamond shaped openings in the shape of an open ended cube. The webbing 103 is joined into the rope 105 at the open end of the cube to extend the lattice 107, thus forming the bottom section 111 of the cargo net 101. The knots 113 between the rope 105 and the webbing 103 are the same as the knots 115 in the upper section between strands of rope 105. The webbing 103 passes through a plurality of pallet attachment fittings 117, with one pallet attachment fitting 117 positioned in each section, or alternatively every other or every third section, of the diamond of the lattice 107 on the bottom section 111.

Using webbing in lieu of rope for the bottom section provides the cargo net with increased resistance to abrasion. The webbing's flat surface is less readily abraded by the rubbing and pressures caused by the pallet attachment fittings because the flat surface spreads the abrasive forces out over a greater area. The increased surface area of the webbing also helps prevent wear and tear caused when the cargo is dragged across airport floors, ramps, and loading areas. The fittings also tend to not move on the webbing as much as with the rope, so the webbing is subjected to less wear and tear.

The webbing 103 is preferably constructed from a nylon or polyester material, however, other materials may be used including, but not limited to, polymeric reinforcing fibers such as Kevlar® or Spectra®, or any other material which can be manufactured into a webbing, has enough flexibility to be joined into the lattice, and serves the needs of the user. Preferably, the tensile strength of the webbing 103 is approximately equal to or greater than that of the rope 105 used for the upper section. However, because the webbing 103 has an increased resistance to abrasion, webbing with a strength rating less than that of the rope may be used. The webbing 103 may also be specially treated to give it additional abrasion resistance, but whether or not the webbing 103 is treated depends primarily on the needs of the user.

Figure 3:
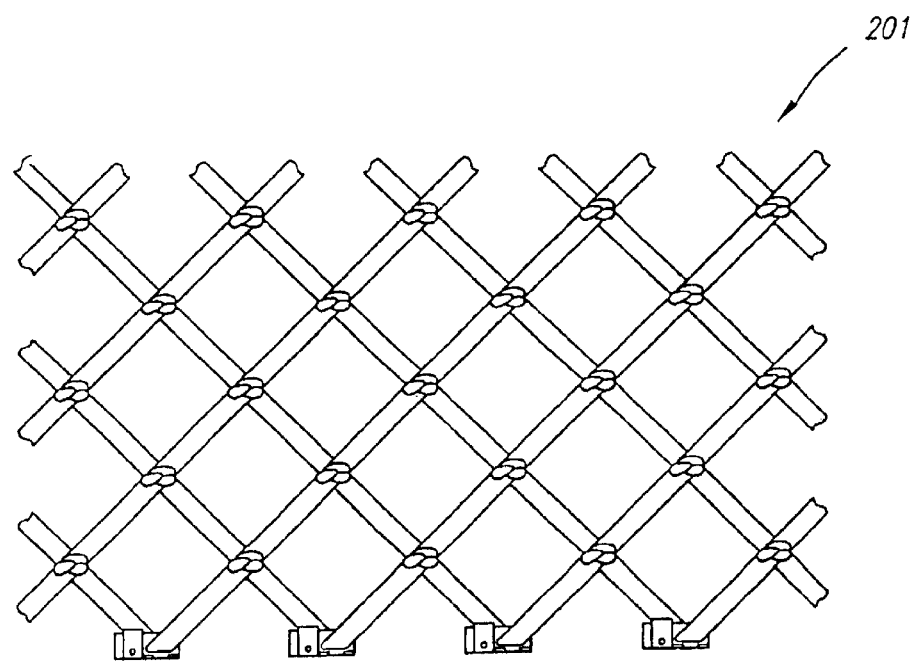
FIG. 3 is a close up of a cargo net according to an alternative embodiment.

FIG. 3 illustrates an alternative embodiment in which a cargo net 201 comprises additional sections of rope replaced by webbing. Two or more sections of the net may comprise webbing, or alternatively the entire cargo net may comprise webbing. The amount of webbing included in the cargo net is entirely within the discretion of the manufacturer and user.

Incorporating the webbing into a cargo net is a relatively straightforward process. A cargo net having a bottom section comprising webbing may be fabricated in the same manner as a rope cargo net with only minor adjustments in the fabrication technique. These minor adjustments are needed to account for the flat shape of the webbing.

Thus, a cargo net with a bottom webbing is disclosed. While embodiments and applications of this invention have been shown and described, it would be apparent to those skilled in the art that additional modifications are possible without departing from the inventive concepts herein. The invention, therefore, is not to be restricted except in the spirit of the appended claims.

What is claimed is:

1. A cargo net comprising:
   a first section comprising a plurality of rope strands knotted together to form a first lattice;
   a second section comprising a substantially flat webbing knotted together at substantially regular intervals to form a second lattice, with the webbing of the second section knotted to the rope strands of the first section.

2. The cargo net of claim 1 wherein the plurality of rope strands and the webbing form a continuous substantially diamond-shaped lattice.

3. The cargo net of claim 1 wherein the first section is formable into an open ended cube, and the second section is attached to the first section at the open end of the cube.

4. The cargo net of claim 1 further comprising a plurality of pallet attachment fittings attached to the webbing.

5. The cargo net of claim 4 wherein a lower section of the webbing passes through the plurality of pallet attachment fittings at substantially regular intervals.

6. The cargo net of claim 5 wherein the pallet attachment fittings are slidable along the lower section of the webbing.

7. A cargo net comprising:
   a first section comprising a plurality of rope strands knotted together;
   a second section comprising a plurality of substantially flat webbing strips, including an uppermost webbing strip knotted to a lowermost portion of the first section of rope strands at substantially regular intervals, and a successive webbing strip knotted to a lowermost portion of the uppermost webbing strip at substantially regular intervals.

8. The cargo net of claim 7 wherein each webbing strip extends laterally in a substantially half-diamond pattern.

9. The cargo net of claim 7 wherein the first section and the second section form a continuous substantially diamond-shaped lattice.

10. The cargo net of claim 7 wherein the first section is formable into an open ended cube, and the second section is attached to the first section at the open end of the cube.

11. The cargo net of claim 7 further comprising a plurality of pallet attachment fittings attached to a lowermost webbing strip of the successive webbing strips.

12. The cargo net of claim 11 wherein the lowermost webbing strip passes through the plurality of pallet attachment fittings at substantially regular intervals.

13. The cargo net of claim 12 wherein the pallet attachment fittings are slidable along the lowermost webbing strip.

14. A cargo net comprising:
   a plurality of substantially flat webbing strips knotted together, wherein each webbing strip extends laterally in a repeating substantially half-diamond-shaped pattern; and
   a plurality of rope strands knotted to an uppermost webbing strip of the plurality of webbing strips.

15. The cargo net of claim 14 wherein the rope strands and the webbing strips form a continuous substantially diamond-shaped lattice.

16. The cargo net of claim 14 further comprising a plurality of pallet attachment fittings attached to a lowermost webbing strip of the plurality of webbing strips.

17. The cargo net of claim 16 wherein the lowermost webbing strip passes through the plurality of pallet attachment fittings at substantially regular intervals.

18. The cargo net of claim 17 wherein the pallet attachment fittings are slidable along the lowermost webbing strip.

19. A cargo net comprising:
   a first lattice form by knotted rope; and
   a second lattice formed by a knotted webbing with the second lattice attached to the first lattice via knotting.

* * * * *